Figure 1:
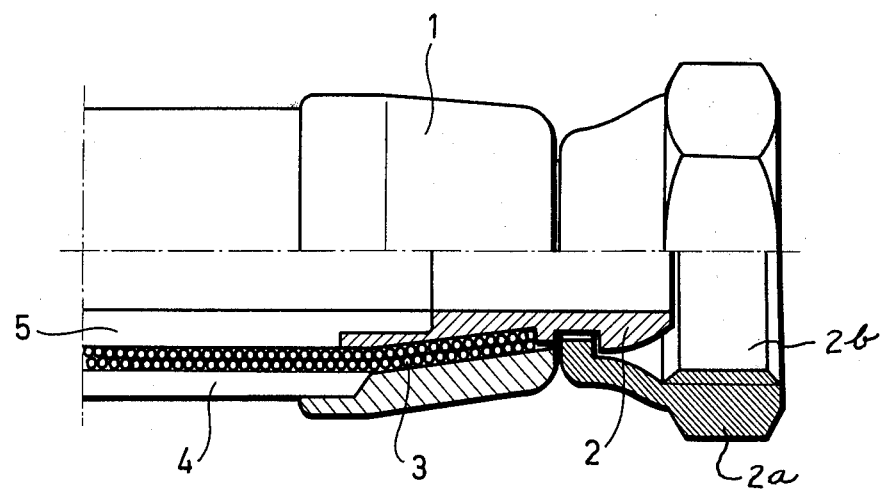

United States Patent [19]

Horváth et al.

[11] 4,000,920
[45] Jan. 4, 1977

[54] COUPLING FOR REINFORCED FLEXIBLE HOSES

[75] Inventors: László Horváth; Gusztáv Gündisch; Sándor Antal; Mihály Árvai; György Zádor; Elemer Lantos, all of Budapest, Hungary

[73] Assignee: Taurus Gumiipari Vallalat, Budapest, Hungary

[22] Filed: July 22, 1975

[21] Appl. No.: 598,126

Related U.S. Application Data

[63] Continuation of Ser. No. 456,208, March 29, 1974, abandoned.

[30] Foreign Application Priority Data

Mar. 30, 1973 Hungary .......................... OA 518

[52] U.S. Cl. .......................... 285/149; 285/DIG. 16
[51] Int. Cl.² .......................... F16L 39/00
[58] Field of Search .......... 285/149, 256, DIG. 16, 285/259; 138/109

[56] References Cited

UNITED STATES PATENTS

| 2,394,632 | 2/1946 | Parker | 285/149 |
|---|---|---|---|
| 2,685,458 | 8/1954 | Shaw | 285/256 X |
| 2,920,910 | 1/1960 | Schnabel | 285/149 |
| 3,318,620 | 5/1967 | Cullen et al. | 285/DIG. 16 |
| 3,799,587 | 3/1974 | Chevalier et al. | 285/149 |

FOREIGN PATENTS OR APPLICATIONS

| 79,644 | 5/1971 | Germany | 285/DIG. 16 |
|---|---|---|---|
| 992,378 | 5/1965 | United Kingdom | 285/256 |
| 774,552 | 5/1957 | United Kingdom | 285/149 |
| 1,083,741 | 9/1967 | United Kingdom | 285/256 |

*Primary Examiner*—Dave W. Arola
*Attorney, Agent, or Firm*—Young & Thompson

[57] ABSTRACT

A coupling for reinforced hoses comprises inner and outer metal sleeves with the end of the reinforcement secured between them. The hose core and cover of elastomeric material are disposed respectively on the inner and outer sides of the reinforcement and are bonded thereto and underlie at least a portion of the inner and outer metal sleeves, respectively. The bore of the coupling is smooth and may be comprised entirely by the hose core or by a smoothly continuous inner surface of the hose core and the inner sleeve.

1 Claim, 2 Drawing Figures

COUPLING FOR REINFORCED FLEXIBLE HOSES

This is a continuation of application Ser. No. 456,208, filed Mar. 29, 1974, now abandoned.

The present invention relates to couplings for metal reinforced flexible hoses, which hoses are comprised of elastomers, the assembly being cemented together.

The present invention is an improvement and further development of a hose coupling of the type shown in Hungarian Pat. No. 157,310.

A number of solutions for the coupling of flexible hoses to other structural elements are known. Generally, they fall in two groups:

1. Releasable couplings in which a sleeve with an internal thread is applied from the outside to the hose, and a counter element having an external thread is inserted in this sleeve. The force produced by the frictional screw joint prevents the coupling device from slipping off the hose.

2. Permanent couplings, in which a coupling sleeve is disposed on the outside and is pressed via the hose wall onto an internal sleeve, thereby providing a frictional force to absorb the axial stresses.

Other prior art patents disclosing such constructions are as follows:
  German Pat. Nos. 907,160; 881,132; 1,032,897; 818,890.
  Russian Pat. No. 108,010.
  French Pat. No. 911,587.
  U.S. Pat. Nos. 2,638,361; 2,535,460; 2,520,372; 2,463,293; and 1,969,548.

All of these coupling members have in common the disadvantage that their structure is complicated and their dimensions are necessarily excessively large, and that they provide only a relatively small through-flow cross section. Even more serious is the disadvantage that frictional force determines the strength of the mounting of the reinforcing inserts; and accordingly, it has been necessary to impress sharp grooves into the reinforcing inserts for the purpose of increasing this force. As a result, the inserts are subject to increased wear and hoses having such coupling members therefore do not have a long life.

The arrangement disclosed in the above-identified Hungarian patent is free from these drawbacks, but it still has the difficulty that it cannot be employed in connection with hoses exposed to higher axial stress without excessive internal pressure. This is due to the fact that adhesives utilized for attaching the coupling to the hose are unable to withstand higher tearing forces.

Accordingly, it is an object of the present invention to provide a coupling for reinforced flexible hoses which overcomes the above-identified disadvantages of the prior art.

Another object of the present invention is to provide such a coupling, which will be relatively simple and inexpensive to manufacture, easy to install, maintain and repair, and rugged and durable in use.

Briefly, the objects of this invention are achieved by providing a coupling for reinforced flexible hose, having a reinforcing element cemented to the remaining parts of the hose. This reinforcing element is cemented at one end between inner and outer sleeves and is at least partially covered with elastomer. The reinforcement is preferably a metal helix, which participates in adsorbing a portion of the axial load and also supports the hose against compressive forces.

It is therefore possible to maintain the internal diameter of the flexible hose substantially constant. This is achieved by making the hose core continuous from end to end, and extending beneath the coupling, or by providing a smooth transition between the internal surface of the hose core and the internal surface of the inner sleeve of the coupling.

Figure 2:
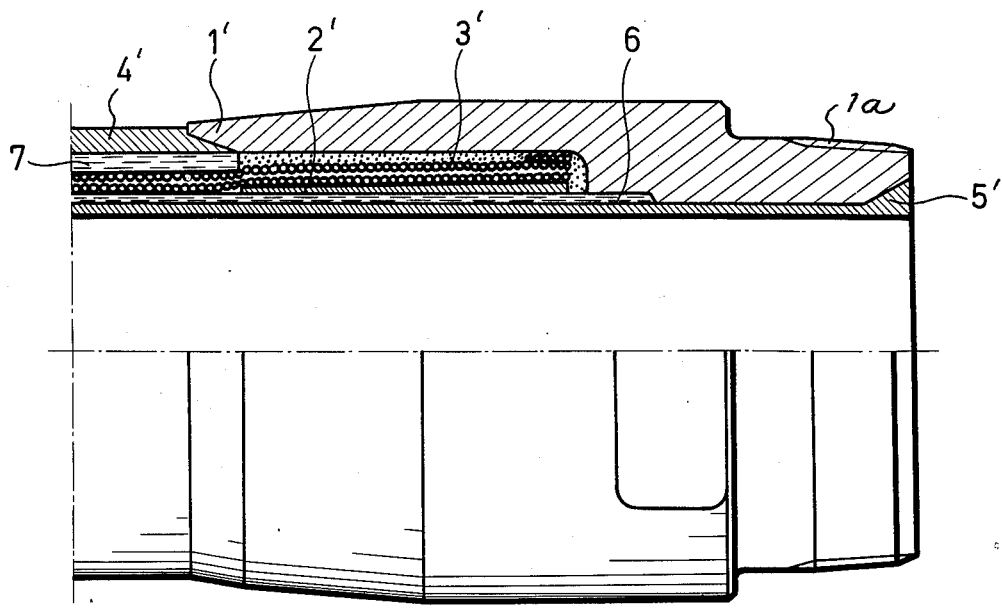

Other objects, features and advantages of the present invention will become apparent from a consideration of the following description, taken in connection with the accompanying drawings, in which:

FIG. 1 is a view partly in elevation and partly in cross section, of a first embodiment of coupling according to the present invention; and FIG. 2 is a view similar to FIG. 1 but showing a second embodiment particularly well suited for deep well drilling with hose of a large diameter and the application of high pressure thereto.

Referring now to the drawings in greater detail, and first to the embodiment of FIG. 1, there is shown a coupling for reinforced flexible hoses according to the present invention, comprising a metal coupling proper comprised by an outer sleeve 1 and an inner sleeve 2 concentric with sleeve 1 and disposed therein. A metal reinforcement 3, comprising a continuous wire helix is disposed between the cover 4 and the core 5 of the hose, both of which latter are of elastomeric material such as rubber. The end of reinforcement 3 is disposed between and secured by cementing to both of sleeves 1 and 2 in a recess therefor provided in one of the sleeves. A ferrule 2a is rotatably disposed in a groove of sleeve 2 and is internally provided with screw threading 2b for purposes of coupling to another member (not shown).

It is to be noted that the inner surfaces of sleeve 2 and core 5 are substantially continuous along a smoothly cylindrical contour. It is also to be noted that the reinforcement 3 departs very little from cylindrical configuration at the coupling end thereof.

Notice also that an end of each of sleeves 1 and 2 has an annular recess therein for the reception therewithin of the adjacent end of the cover 4 and core 5, respectively, the cover 4 and core 5 being adhesively bonded to reinforcement 3.

In FIG. 2 a construction is shown in which similar elements are designated by similar reference numerals but with the addition of prime marks. The construction of FIG. 2 is generally useful for higher pressure, such as in deep well drilling hoses of large diameter. In FIG. 2, it is to be noted that the screw threads 1a are on the sleeve 1', and that the inner surface of the core 5' is smoothly continuous full length of the coupling. Fabric inserts 6 and 7 are provided on opposite sides of the reinforcement 3', between the reinforcement 3' and the core 5' and the cover 4', respectively.

It will be of course be understood that instead of spiral wound wire reinforcements 3 and 3', these reinforcements can be of S or Z cross section and can be wound at a helix angle of up to 10°.

The coupling member of the present invention thus has the advantage that the diameter of the winding of the reinforcing inserts remains substantially unchanged or is only slightly reduced, and that it is no longer necessary to provide ribs penetrating into the inserts and causing premature destruction of the same. The useful lifetime of the device of the present invention is accordingly greatly extended.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

Having described our invention, we claim:

1. Coupling device comprising a flexible hose of elastomer reinforced with layers of wires, there being a core of said elastomer bonded to the inside of said layers of wires and a cover of said elastomer bonded to the outside of said layers of wires, an outer socket adhesively bonded to the end of said flexible hose and an inner supporting sleeve bonded adhesively to said flexible hose, the inner surface of said inner sleeve being cylindrical, one end of said inner sleeve being disposed within said outer socket, said supporting sleeve and said outer socket being out of metallic contact with one another, the sole connection between said supporting sleeve and outer socket being an adhesive connection through said flexible hose, the end portion of said layers of wires extending axially beyond said core and cover, the outer surface of said supporting sleeve and the inner surface of said outer socket grasping said end portion of said layers of wires between them and each comprising a truncated cone whose apex is disposed endwise outwardly of said flexible hose, said cover extending axially partway between said wires and said outer socket, said supporting sleeve extending axially partway between said wires and said core.

* * * * *